United States Patent
Chou et al.

(10) Patent No.: US 8,164,568 B2
(45) Date of Patent: Apr. 24, 2012

(54) COMPUTER MOUSE

(75) Inventors: Chia-Shin Chou, Taipei Hsien (TW); Zhen-Xing Ye, Shenzhen (CN)

(73) Assignees: Hong Fu Jin Precision Industry (ShenZhen) Co., Ltd., Shenzhen, Guangdong Province (CN); Hon Hai Precision Industry Co., Ltd., Tu-Cheng, New Taipei (TW)

( * ) Notice: Subject to any disclaimer, the term of this patent is extended or adjusted under 35 U.S.C. 154(b) by 296 days.

(21) Appl. No.: 12/619,569

(22) Filed: Nov. 16, 2009

(65) Prior Publication Data

US 2011/0043450 A1   Feb. 24, 2011

(30) Foreign Application Priority Data

Aug. 21, 2009   (CN) .......................... 2009 1 0305927

(51) Int. Cl.
*G06F 3/033* (2006.01)
(52) U.S. Cl. .................................................. 345/163
(58) Field of Classification Search .................. None
See application file for complete search history.

(56) References Cited

U.S. PATENT DOCUMENTS

| | | | |
|---|---|---|---|
| 5,457,480 A * | 10/1995 | White | 345/163 |
| 6,369,797 B1 * | 4/2002 | Maynard, Jr. | 345/163 |
| 2007/0035520 A1 * | 2/2007 | Hsu | 345/163 |
| 2008/0186277 A1 * | 8/2008 | Wang | 345/163 |
| 2010/0007607 A1 * | 1/2010 | Li | 345/163 |

\* cited by examiner

*Primary Examiner* — Paul Huber
(74) *Attorney, Agent, or Firm* — Altis Law Group, Inc.

(57) ABSTRACT

A computer mouse includes a mouse body and a hood. The hood is adjustably attached to a top of the mouse body.

4 Claims, 4 Drawing Sheets

COMPUTER MOUSE

BACKGROUND

1. Technical Field

The present disclosure relates to input devices, and particularly to a computer mouse.

2. Description of Related Art

With the widespread use of computers, the computers are playing a more and more important role in people's lives. And the computers require many peripherals, such as speakers, keyboards, mice, and so on, to fully take advantage of the computers. However, a size of a mouse generally cannot be adjusted, which cannot fit for everybody's need.

DETAILED DESCRIPTION

Figure 1:
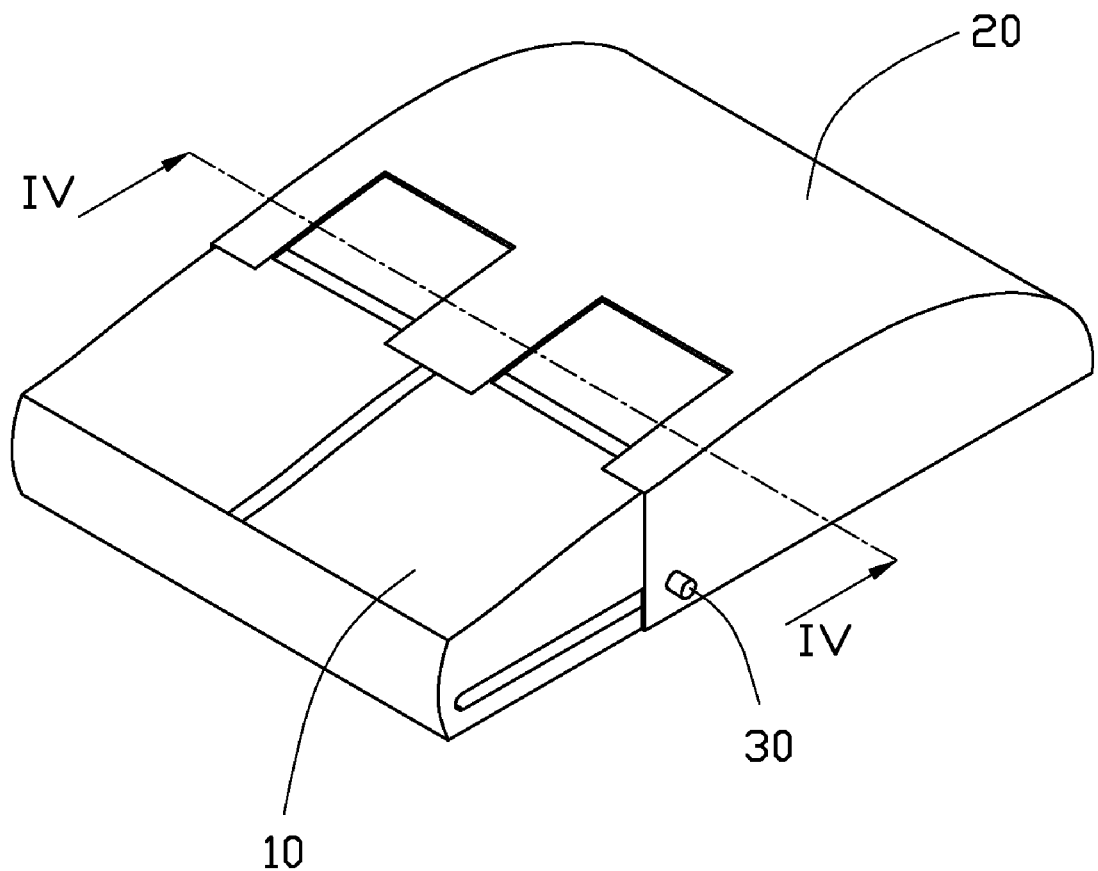
FIG. 1 is an assembled, isometric view of an exemplary embodiment of a computer mouse.

Referring to FIG. 1, an exemplary embodiment of a computer mouse includes a mouse body 10, a hood 20, and two positioning members 30. The hood 20 is slidably attached to the mouse body 10, by the positioning members 30.

Figure 2:
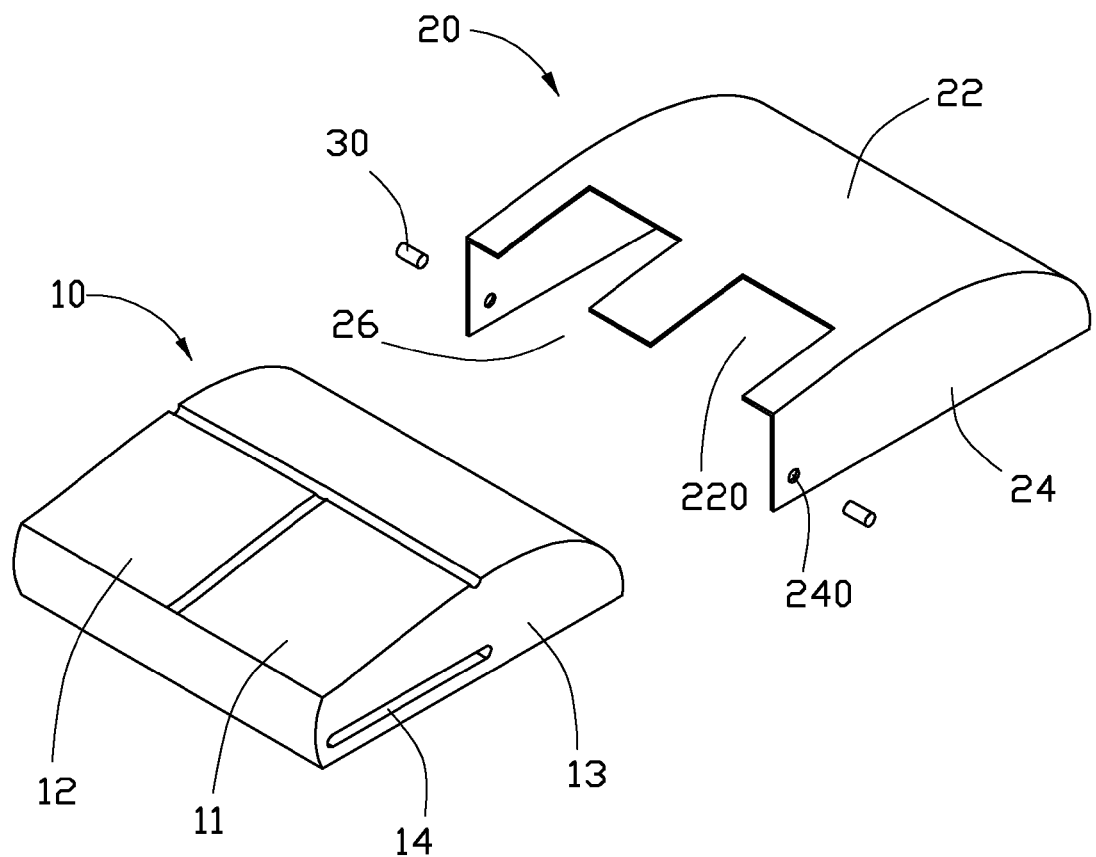
FIG. 2 is an exploded isometric view of the computer mouse of FIG. 1.
Figure 3:
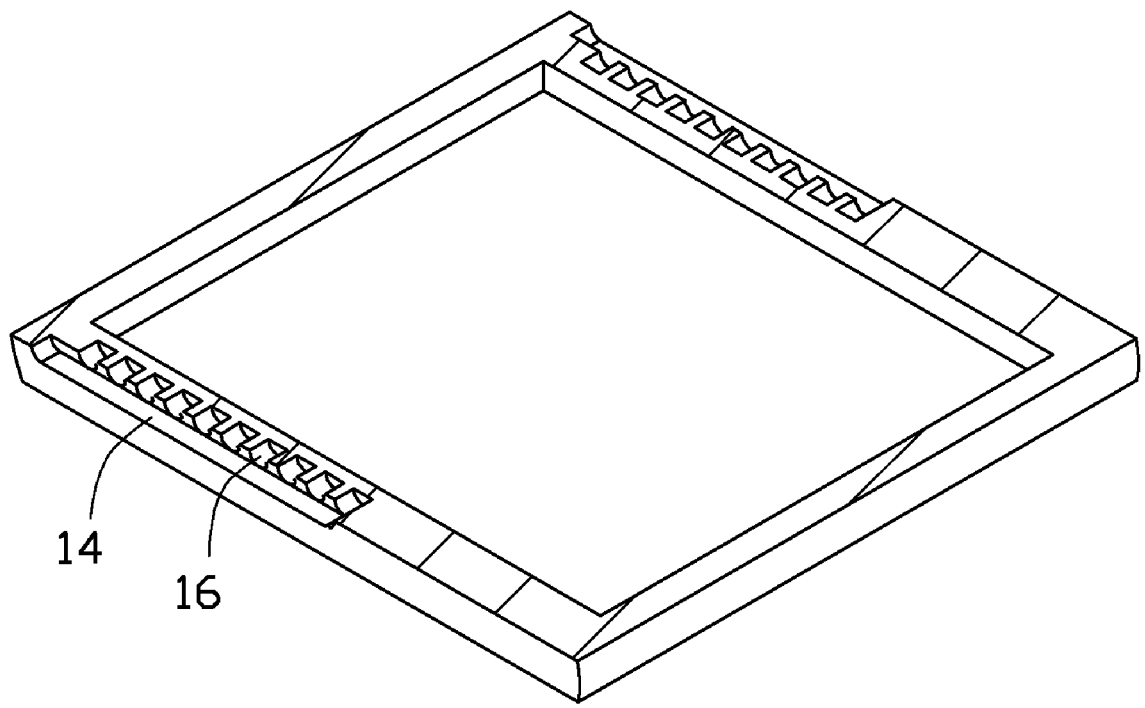
FIG. 3 is a cutaway view of a mouse body of the computer mouse of FIG. 2.
Figure 4:
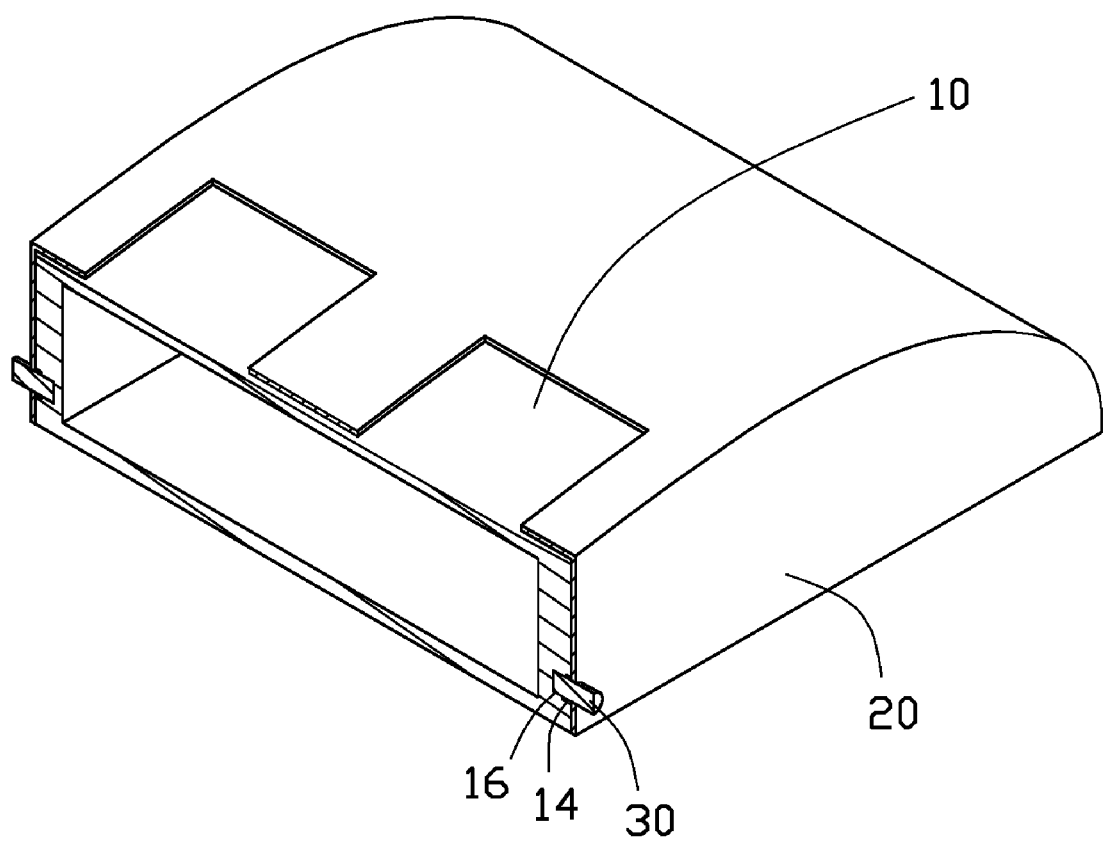
FIG. 4 is a sectional view of the computer mouse, taken along the line IV-VI of FIG. 1.

Referring to FIGS. 2 to 4, a left button 11 and a right button 12 are formed on a front end of a top wall of the mouse body 10. Two opposite sidewalls 13 extending from opposite sides of the top wall of the mouse body 10 respectively define a sliding groove 14. A bottom wall of each of the sliding grooves 14 defines a plurality of fixing holes 16.

The hood 20 includes an arc-shaped plate 22, two side plates 24 extending from opposite sides of the plate 22. A receiving space 26 is bounded by the plate 22 and the two side plates 24. Two openings 220 are defined in a front end of the plate 22, corresponding to the left button 11 and the right button 12 of the mouse body 10. Two through holes 240 are respectively defined in front ends of the side plates 24.

In assembly, the hood 20 covers on the mouse body 10, to receive the mouse body 10 in the receiving space 26. The side plates 24 of the hood 20 respectively resist against the sidewalls 13 of the mouse body 10, with the through holes 240 respectively aligning with the sliding grooves 14. The two openings 220 are respectively in alignment with the left button 11 and the right button 12, exposing the left button 11 and the right button 12. Each positioning member 30 passes through the through hole 240 of a corresponding side plate 24 of the hood 20 and the sliding groove 14 of a corresponding sidewall 13 of the mouse body 10, to engage one of the plurality of fixing holes 16 of the sidewall 13.

In use, the two positioning members 30 are released from the corresponding fixing holes 16, thereby the hood 20 can be moved to a proper position of the mouse body 10, corresponding to different users, then positioning members 30 are engaged in another two corresponding fixing holes 16.

It is to be understood, however, that even though numerous characteristics and advantages of the present disclosure have been set forth in the foregoing description, together with details of the structure and function of the disclosure, the disclosure is illustrative only, and changes may be made in detail, especially in matters of shape, size, and arrangement of parts within the principles of the disclosure to the full extent indicated by the broad general meaning of the terms in which the appended claims are expressed.

What is claimed is:

1. A computer mouse comprising:
a mouse body; and
a hood adjustably attached to a top of the mouse body; and
two positioning members, wherein two opposite sidewalls of the mouse body each define a sliding groove, a bottom wall of the sliding groove defines a plurality of fixing holes, each positioning member is operable of passing through the hood and a corresponding one of the sliding grooves to be selectively engaged in one of the plurality of fixing holes of the corresponding sidewall of the mouse body.

2. The computer mouse of claim 1, wherein the hood comprises an arc-shaped plate to cover on the mouse body, and two side plates extending from opposite sides of the plate to resist against the opposite sidewalls of the mouse body.

3. The computer mouse of claim 2, wherein the two side plates of the hood each define a through hole, for the corresponding positioning member passing through.

4. The computer mouse of claim 2, wherein the mouse body comprises a left button and a right button, the plate of the hood defines two openings, to expose the left button and the right button.

* * * * *